Patented Oct. 7, 1952

2,613,153

UNITED STATES PATENT OFFICE 2,613,153

REFRACTORY INSULATING BRICK AND METHOD OF MANUFACTURE

William L. Stafford, Somerville, N. J., assignor to Johns-Manville Corporation, New York, N. Y., a corporation of New York No Drawing. Application May 17, 1949, Serial No. 93,844

12 Claims. (Cl. 106—41)

This invention relates to light weight refractory insulating brick, and particularly to an improved high temperature insulating brick and method of making the same.

The present invention is a continuation-in-part of and improvement on that described in my copending patent application, Serial No. 760,126, for Refractory Insulating Brick and Method of Manufacture, filed July 10, 1947, now abandoned.

Many different molding compositions and methods have been heretofore proposed for the manufacture of light weight refractory insulating brick. Conventional methods generally involved admixture of an organic burn-out material with a plastic clay-grog mix, molding the mixture to shape, and drying and burning out the organic filler during firing of the shaped brick to develop porosity. Difficulty has been encountered in attempts to develop refractory insulating brick of such low density as to adapt them for efficient heat insulation, by reason of the manufacturing problems encountered in developing the necessary internal porosity without serious loss of compressive strength and volumetric stability. The insulating bricks which are produced by conventional methods tend to develop an undesirable degree of volume contraction and spalling, as well as loss of strength, when employed as furnace linings exposed to temperatures substantially in excess of 2600° F.

A primary object of the present invention is to provide a refractory insulating brick of light weight which resists spalling and exhibits volume stability at temperatures as high as 3000° F.

Another object is to provide a volume-stable light weight refractory insulating brick having such compressive strength and resistance to thermal shock as to adapt it for use in linings for high temperature furnaces.

A further object is to provide an economical and efficient method of making high temperature insulating brick of high quality.

With the above objects in view, the invention consists in the improved refractory insulating brick and method of manufacture which are hereinafter described and more particularly defined by the accompanying claims.

The present invention is based upon the discovery that a refractory insulating brick of light weight and of exceptional volumetric stability and compressive strength at high temperature, can be produced by incorporating finely divided metallic aluminum and alumina in a plastic clay batch which is molded, dried and fired to form the brick. Satisfactory bricks are obtained when the batch contains 2–5% dry weight of metallic aluminum and 25–30% alumina, together with a good grade of kaolin clay and grog of the same composition as the brick. The bricks herein referred to are molded and fired shapes which may be of standard size or which may be considerably larger, as for example with the dimensions 24 x 9 x 2½ inches.

An economical source of metallic aluminum and alumina in suitable dry weight proportions, is a partially hydrated pulverulent aluminum dross. However, many crude aluminum drosses contain impurities of a kind and in amount having an adverse effect on the desired properties of the finished brick.

Finely divided crude aluminum dross reacts violently with hot water, with liberation of hydrogen gas and ammonia, and accordingly it is not practicable or desirable to incorporate the crude dross in more than minor proportions in wet clay mixtures which are to be molded, dried and fired, because rapid liberation of gas develops fissures and cracks throughout the molded shape.

Dependable results can be obtained by incorporating granular aluminum and finely divided calcined alumina in a plastic clay batch in approximately the proportions indicated above. A suitable form of granular aluminum is made by blowing with air a fine stream of molten aluminum so as to produce rough metal pellets classifying as to standard screen size chiefly between 10 and 28 mesh. An available source of alumina may be corundum or fused alumina classifying as to size between 40 and 120 mesh. However, there is some advantage in employing a calcined alumina, or a grog of high alumina to silica ratio, as the source of alumina, since such calcined alumina materials are porous and have comparatively low density.

When partially prehydrated aluminum dross, or a mixture of granular aluminum and calcined alumina, is incorporated in a plastic clay brick-molding batch in suitable proportions, the molded brick, after drying and firing to a high temperature, is more refractory and volume-stable than brick made of a similarly proportioned mixture of refractory clay and commercial corundum of equivalent aluminum oxide and impurity oxide content. Corundum is exceedingly refractory, is inert chemically, and has a low thermal expansion when heated over the normal firing-temperature range. However, corundum is insufficiently reactive when admixed with plastic refractory clays in the theoretical proportions to enter into combining reactions with the silica of the clay at brick-firing temperature. Furthermore, the expansion rate of corundum in the proportions called for is insufficient to counterbalance the shrinkage of the clay, when firing a predetermined molded mixture to the temperatures required to develop optimum volumetric stability.

Sawdust or other organic filler material is embodied in the plastic molding batch as burn-out material for developing porosity. However, in following the procedure of incorporating partially hydrated aluminum dross or grained metallic aluminum in the batch, a substantially greater degree of porosity and much greater strength and volumetric stability is obtained in the fired product than would be expected from the composition of the batch. The amount of water which is added to the mixture for making up a batch is only sufficient to plasticize the mixture for shaping. However, during the drying and initial firing stages the molded batch also incorporates a substantial proportion of combined water, including the combined water present in the plastic clay binder, and also combined water which is present in the partially hydrated dross or as hydrated metallic aluminum. The increase in porosity of the resulting brick, which is developed without adverse effect on the strength and volume stability, is believed to be attributable to the gradual release of hydrogen and other gases resulting from liberation and decomposition of combined water during the final high temperature firing operation.

Suitable molding mixtures for producing insulating refractory bricks having a density in the range 60 to 67 lbs./cu. ft., a modulus of rupture of 125–200 lbs./sq. in., a compressive strength of 200–400 lbs./sq. in., and having high volumetric stability and resistance to spalling, have approximately the following dry weight composition: Kaolin 45–50%; calcined alumina 25–30%; metallic aluminum 2–5%; and grog 20–25%. Sawdust is introduced to the extent of about 8–12% of the mixture.

Molding mixtures in which aluminum dross is present, and which have proved effective for producing light weight insulating refractory bricks having exceptional volumetric stability at temperatures of 3000° F. or lower, and which resist spalling over long periods of use at such temperatures, are the following:

| | Per cent |
|---|---|
| Sawdust | 14–15 |
| Kaolin | 45–50 |
| Aluminum dross | 15–40 |
| Grog | 0–20 |

The sawdust preferably consists of white and yellow pine ground to a size of substantially −14 mesh. A preferred kaolin is one of uniform fine grain structure having a pyrometric cone end-point (PCE) of at least cone 33. A good grade of Georgia kaolin or washed Florida kaolin is satisfactory. A satisfactory aluminum dross comprises waste products from the refining of substantially pure metallic aluminum. The dross from heavily alloyed aluminum has been found to give unsatisfactory results. Certain alloying metals, for example magnesium and copper, adversely affect the insulation brick when present in substantial quantity. For example, as little as ½% of magnesia in a refractory insulation brick imparts high shrinkage characteristics when the brick is subjected to reheat firing at 3000° F. A satisfactory dross is one containing large amounts of aluminum oxide, substantial amounts of aluminum nitride and metallic aluminum, and small amounts of aluminum carbide and impurities. The grog is preferably made of burned brick of the same kind as that produced by the present process.

The aluminum dross reacts vigorously with hot water, evolving heat and gases. The first step in the process when using dross, consists in prereacting the aluminum dross with hot or cold water prior to its incorporation in the brick mix. This preliminary hydration reaction is necessary in order to precondition the dross to reduce its tendency for excessively rapid gas and heat liberation during the brick molding and drying operations. An incidental reason for this preliminary reaction is to minimize evolution of objectionable odors and combustible gases during drying operations.

A suitable dross, before hydration, had the following composition:

| | Per cent |
|---|---|
| Aluminum oxide | 51.80 |
| Aluminum nitride | 19.78 |
| Aluminum metal | 22.65 |
| Magnesium oxide | 0.19 |
| Copper oxide | .01 |
| Ferric oxide | 1.55 |
| Silica and other impurities | 4.02 |

After partial hydration the dross had the following approximate analysis:

| | Per cent |
|---|---|
| Aluminum oxide | 61.40 |
| Aluminum nitride | 10.0 |
| Aluminum metal | 12.0 |
| Magnesium oxide | .20 |
| Ferric oxide | 1.40 |
| Combined water and other impurities | 15.0 |

A suitable kaolin clay has the following composition:

| | |
|---|---|
| Silica | 53.7% |
| Iron oxide | 1.5% |
| Alumina | 44.9% |

Preliminary treatment of the aluminum dross may include the steps of heating water to a temperature of about 200° F., then sprinkling pulverulent dross into the water in the proportions of about two pounds of dross to one pound of water. This amount of water is substantially that theoretically necessary to form aluminum hydrate by reaction with about one-fourth of the aluminum content of the dross. Evolution of ammonia and other gases starts almost immediately, and the reaction is continued at the indicated temperature for about two hours, at the end of which period the dross shows about 10% gain in dry weight and is considered to be in satisfactory condition for incorporation in the brick mix. The exothermic reaction and partial hydration and oxidation of some of the aluminum nitride, carbide and metallic aluminum in the dross produces a comparatively dry product by the end of a two hour reaction with water in the proportions indicated. Any residual water may be completely removed by air-drying the product of the reaction, and the dross is then conditioned for use in a brick batch by breaking up any soft lumps of reacted dross material.

A typical molding batch is one comprising 14% sawdust, 46.4% kaolin, 22.1% prehydrated aluminum dross and 17.5% grog. The grog is waste from grinding fired brick of the indicated composition to size. All of the dry ingredients should be sized to pass a 35 mesh screen, and the kaolin should be so finely divided as to all pass a 48 mesh screen. The batch may be prepared for molding by mixing the kaolin, sawdust and grog dry, adding the prehydrated dross, and further mixing the pulverulent dry material with water in the proportions of about two pounds of dry batch with approximately one pound of water. The plastic tempered mixture which is thus formed is loaded into molds of convenient size. After the molding operation the brick should be subjected to a slow drying operation at temperatures of 200–400° F., and the dry bricks then fired in an oxidizing atmosphere to a final temperature of 2600° F. (pyrometric cone 16).

In producing the bricks using a molding mixture containing 25–30% calcined alumina and 2–5% grained metallic aluminum, together with kaolin and about 20–25% grog, it is not necessary to prehydrate the aluminum. The small amount of fine grained aluminum present in this molding mixture is not excessively reactive with the water present in the batch. The method of forming the grained aluminum probably develops a thin oxide coating over each grain which serves to limit the water reactivity of the metal to an extent such that the final brick product, after firing in an oxidizing atmosphere for several hours at a temperature in the neighborhood of 2600–2700° F. and even after exposure to oxidizing furnace temperatures of 3000° F. for several hours, still retains from about .5 to 1% of finely divided metallic aluminum distributed throughout the structure.

A typical molding batch expressed in dry weight proportions, for producing a brick of about 65–67 lbs./cu. ft. density and 200 lbs./sq. inch transverse strength, was as follows:

| | Per cent |
|---|---|
| Calcined alumina | 28 |
| Kaolin | 47 |
| Grog | 22 |
| Grained aluminum | 3 |

Sawdust was included amounting to about 10% of the mixture.

Fired bricks which were produced by the present methods had the following properties:

| | |
|---|---|
| Density | 62–67 lbs./cu. ft. |
| Transverse strength or modulus of rupture | 140–200 lbs./sq. in. |
| Compressive strength | 180–400 lbs./sq. in. |
| Linear shrinkage after: | |
| 24 hours at 2800° F. | 0.1% (approximate) |
| 5 hours at 3000° F. | 0.5–3.7% |
| Thermal conductivity | 3.60 B. t. u. in./hr./sq. ft./°F., mean temperature 2000° F. |
| PCE | above cone 37 (3308° F.) |

The linear shrinkage tests were supplemented by raising a hot furnace lining made of the brick to a temperature of 2800° F. within a period of 1–1½ hours, holding the temperature constant for a period of 6–7 hours, and then allowing the furnace lining to cool over night. This cycle was repeated ten times. Similar furnace linings were subjected to two to five cycles of rapidly heating to 3000° F. and holding such temperature for 5–6 hours before cooling over night. At the end of such tests, the bricks forming the furnace lining were found to be unmarred, uncracked and unbroken, and to show only slight degrees of shrinkage at the hot face of the brick. The best available commercial grades of refractory insulating brick cannot stand up under such severe tests without excessive shrinkage, cracking and spalling.

By comparative weight determinations on fired bricks molded from batches incorporating metallic aluminum and alumina, in comparison with bricks made from batches containing no aluminum, it can be shown that during the process of oven-drying the bricks, then firing them in an oxidizing atmosphere at a temperature of 2550° F. for two hours, then at 2600° F. for twenty-four hours, the kaolin content of the brick suffers a weight loss of 13%, whereas the aluminum content of the brick shows a weight increase averaging 21½% based on its original weight prior to hydration. The weight increase thus exhibited by the aluminum suggests the reason for the exceptionally high volume stability and low density of the brick. By partial hydration of aluminum dross the aluminum metal and nitride are partially converted to aluminum hydroxide or hydrate, and during the firing in an oxidizing atmosphere combined water is slowly liberated and decomposed and additional oxygen is absorbed to convert the metal to aluminum oxide. This conversion takes place in a way which insures the presence of highly reactive metallic aluminum in substantial amount within the batch at temperatures high enough to bring about direct combining reactions with silica in the clay.

The high temperature refractory insulating brick herein described contain alumina and silica in approximately the weight ratio of 2:1 or 65–70:35–30. A fired refractory insulation brick having an alumina to silica ratio of about 2:1 imparted thereto by incorporating 27.8% aluminum dross with 58.2% kaolin clay and 14% sawdust in the molding mixture, developed less than 3% volume shrinkage or expansion upon being subjected to a standard reheat firing or shrinkage test at 3000° F. in the manner heretofore described. The fired brick analyzed 30.3% $SiO_2$, 1.6% $Fe_2O_3$, 67.2% $Al_2O_3$ and small amounts of metallic aluminum and aluminum nitride. Tests on an insulation brick having an alumina to silica ratio of 2:1 imparted thereto by incorporating finely divided corundum with the clay in the molding mixture, developed shrinkage to the extent of 8–12% of the brick volume on reheat firing to 3000° F. Thus insulation brick in which the alumina and silica content ranges between 65 and 70% alumina to 35–30% silica, made by incorporating partially hydrated aluminum dross or metallic aluminum and calcined alumina in the clay molding mixture, exhibited much greater volume stability on reheat firing to 3000° F., as compared to insulation brick of the same alumina and silica content imparted by addition of finely divided corundum to the clay molding mixture.

The present brick exhibit by X-ray powder patterns a comparatively high content of crystalline mullite. In fact, examination of X-ray powder patterns has shown the presence of a mullite crystal phase in proportions greater than would be expected from the composition and heat treatment. The presence of mullite in this proportion helps to explain the high strength and volumetric stability of the product, but is very unusual in an unvitrified product which has not been exposed to the temperatures of fusion of the principal alumina and silica components of the product. The presence of mullite in such high proportions is believed to result from the particular procedure employed in the manufacturing operation.

When finely divided dross containing metallic aluminum or aluminum nitride (not more than 6% coarser than standard 20 mesh screen) is preliminarily reacted with about half its weight of water in accordance with the present process, approximately half of the total metallic aluminum or aluminum nitride is converted to aluminum hydroxide, and this aluminum hydroxide forms a coating over the metallic and nitride particles, which coating insulates and protects the particle cores from further reaction. The thus partially reacted metal or metal nitride is then incorporated in the plastic molding batch with additional water, and no substantial further reaction with water takes place during the period in which the molded shape is dried to remove uncombined water. Decomposition of the aluminum hydroxide and oxidation of the uncombined metal and nitride takes place only gradually during the progressive stages of the firing treatment, and a substantial proportion of the metal retains its metallic form until firing temperatures in excess of 2000° F. are developed. At such temperatures the hydroxide coating of the metal particles has decomposed exposing the metallic aluminum to oxidation. The metal at these temperatures is at least partially in nascent state and so reactive that it is believed to enter into combination reactions not only with the oxygen of the surrounding atmosphere but also with the silica component of the clay binder. Substantial amounts of crystalline mullite result from this reaction, even though the reaction temperatures are several hundred degrees below those at which mullite is usually formed by fusion reactions between alumina and silica.

The invention which has been thus described by detailed example is not limited as to such details and it is to be understood that variations, changes and modifications are contemplated within the scope of the invention as defined by the following claims.

What I claim is:

1. A light weight refractory insulating brick having a density of 60–67 lbs./cu. ft. and substantial volumetric stability up to 3000° F. consisting essentially of $Al_2O_3$ and $SiO_2$ in the weight ratio of about 2:1 and having a high content of crystalline mullite, said brick being an unvitrified oxidized and fired reaction product of a uniformly distributed mixture comprising water, finely divided kaolin clay, alumina, combustible material and metallic aluminum.

2. A refractory insulating brick having a density of 60–67 lbs./cu. ft. and volumetric stability up to 3000° F. comprising, the oxidized and fired reaction product of alumina, metallic aluminum and kaolin clay bonding agent, said brick consisting essentially of alumina and silica in approximate dry weight ratio proportions of 65–70:35–30, and having a high content of crystalline mullite.

3. A light weight refractory insulating brick having a density of 60–70 lbs./cu. ft. and substantial volumetric stability at 3000° F., said brick comprising a fired product consisting essentially of alumina and silica in approximate dry weight proportions of 65–70 to 35–30 and containing distributed therethrough approximately .5–1% of finely divided metallic aluminum.

4. A refractory insulating brick having a specific gravity of approximately 1 and having a PCE above cone 30, comprising the oxidized and fired reaction product of a mixture comprising finely divided alumina, aluminum hydrate, metallic aluminum and refractory bonding clay, said brick consisting essentially of alumina and silica in approximately the weight proportions of 2:1, and having a high content of crystalline mullite.

5. A refractory insulating brick having a specific gravity of approximately 1 and having a PCE in the range of cones 34–38, a transverse strength of 140–200 lbs./sq. in., and a crushing strength of 180–400 lbs./sq. in., consisting essentially of $Al_2O_3$ and $SiO_2$ in the approximate weight ratio of 2:1 and having a high content of crystalline mullite, said brick being a substantially unvitrified fired product.

6. In the manufacture of refractory brick the steps comprising, incorporating 2–5% dry weight of finely divided metallic aluminum in a plastic brick molding batch together with finely divided alumina, bonding clay and water, and molding and firing the resulting mixture to a temperature of at least about 2600° F.

7. In the manufacture of light weight refractory insulating brick the steps comprising, partially hydrating finely divided aluminum dross with water to react about half of the metal and nitride content to form a hydrate coating for the dross particles, and incorporating 15–40% by weight of said partially hydrated dross in a plastic brick molding batch comprising finely divided kaolin clay, water and an organic combustible material.

8. In the manufacture of porous insulating refractory brick of about 65 lbs./cu. ft. density consisting essentially of alumina and silica in the weight proportion of about 2:1, the steps comprising, forming a plastic batch containing water and a uniformly distributed mixture of approximately 20–25% dry weight of finely divided grog, 45–50% finely divided kaolin having a PCE of at least 33, 25–30% alumina, and 2–5% metallic aluminum, adding 8–12% of the mixture of finely divided organic combustible material, charging the mold with said batch, drying the molded shape and heating it in an oxidizing atmosphere to burn out the organic content and firing to a temperature of at least 2600° F. for a time sufficient to develop dimensional stability.

9. In the manufacture of porous insulating refractory brick the steps comprising, forming a plastic batch containing water and a uniformly distributed mixture of 40–50% dry weight of finely divided kaolin having a PCE of at least 33, 2–5% finely divided metallic aluminum, 15–40% finely divided alumina and 8–15% of the mixture of finely divided organic combustible material, charging a mold with said batch, drying the molded shape, and heating it in an oxidizing atmosphere to burn out the organic content, and to a firing temperature of approximately 2600° F. to develop dimensional stability.

10. A process of making refractory insulating brick which comprises, reacting with approximately half its weight of water an aluminum dross consisting essentially of alumina, aluminum nitride and metallic aluminum, to partially convert the dross to aluminum hydrate, with liberation of ammonia and hydrogen, forming a molding batch containing approximately one part water and two parts dry solids comprising 15–40% by weight of said partially hydrated dross in dry pulverized form, 8–15% of sawdust, 0–20% grog and the balance chiefly finely pulverized refractory plastic bonding clay, molding said batch, drying the molded product, and firing it in an oxidizing atmosphere to a temperature of at least about 2600° F.

11. In the manufacture of insulating refractory brick of approximately 65-67 lbs./cu. ft. density and 200 lbs./sq. in. transverse strength consisting essentially of alumina and silica in the weight proportions of about 2:1, the steps comprising, forming a plastic batch containing water and a uniformly distributed mixture of approximately 47% finely divided kaolin, 22% grog, 28% finely divided calcined alumina and 3% finely divided metallic aluminum, together with approximately 10% of the mixture of finely divided organic combustible material, charging a mold with said batch, drying the molded shape and heating it in an oxidizing atmosphere to burn out the organic content, and subjecting the thus fired brick to a final firing temperature of 2600° F. to develop dimensional stability.

12. In the manufacture of refractory brick, the steps of molding a plastic brick composition comprising finely divided alumina, bonding clay, water, and from 1.8-5% dry weight of finely divided metallic aluminum, and firing said molded brick to a temperature of at least approximately 2600° F.

WILLIAM L. STAFFORD.

REFERENCES CITED

The following references are of record in the file of this patent:

FOREIGN PATENTS

| Number | Country | Date |
|---|---|---|
| 413,238 | Great Britain | 1934 |
| 587,595 | Great Britain | 1944 |